United States Patent [19]

Marianowski et al.

[11] Patent Number: 4,661,422

[45] Date of Patent: Apr. 28, 1987

[54] ELECTROCHEMICAL PRODUCTION OF PARTIALLY OXIDIZED ORGANIC COMPOUNDS

[75] Inventors: Leonard G. Marianowski, South Holland; Karl S. Vorres, Western Springs, both of Ill.

[73] Assignee: Institute of Gas Technology, Chicago, Ill.

[21] Appl. No.: 708,158

[22] Filed: Mar. 4, 1985

[51] Int. Cl.⁴ .............................................. H02M 8/00
[52] U.S. Cl. ........................................ 429/13; 429/16; 429/8; 204/62
[58] Field of Search .................. 429/13, 16, 8; 204/62

[56] References Cited

U.S. PATENT DOCUMENTS

| | | | |
|---|---|---|---|
| 3,288,647 | 11/1966 | Beigelman et al. | 429/16 |
| 3,427,235 | 2/1969 | Le Duc | 429/13 X |
| 3,544,374 | 12/1970 | D'Alessandro et al. | 429/16 |
| 4,309,359 | 1/1982 | Pinto | 429/16 X |
| 4,329,208 | 5/1982 | Vayenas et al. | 429/33 X |
| 4,450,055 | 5/1984 | Stafford | 429/13 X |

Primary Examiner—Brian E. Hearn
Assistant Examiner—Stephen J. Kalafut
Attorney, Agent, or Firm—Thomas W. Speckman

[57] ABSTRACT

A process for the selective production of partially oxidized organic compounds at the catalytic anode of a fuel cell wherein oxide anions formed at the fuel cell cathode by ionization of oxygen containing gas are transported by a molten salt oxygen containing electrolyte to the catalytic anode where selective partial oxidation of organic compounds is facilitated by the catalytic anode. Suitable catalytic anodes include catalysts selected from elements of the Periodic Table appearing in a group selected from the group consisting of Group IB, IIB, IIIA, VB, VIB, VIIB and VIII, in metallic oxide or cermet form. The process of this invention is particularly useful in the production of methanol by partial oxidation of methane.

23 Claims, 1 Drawing Figure

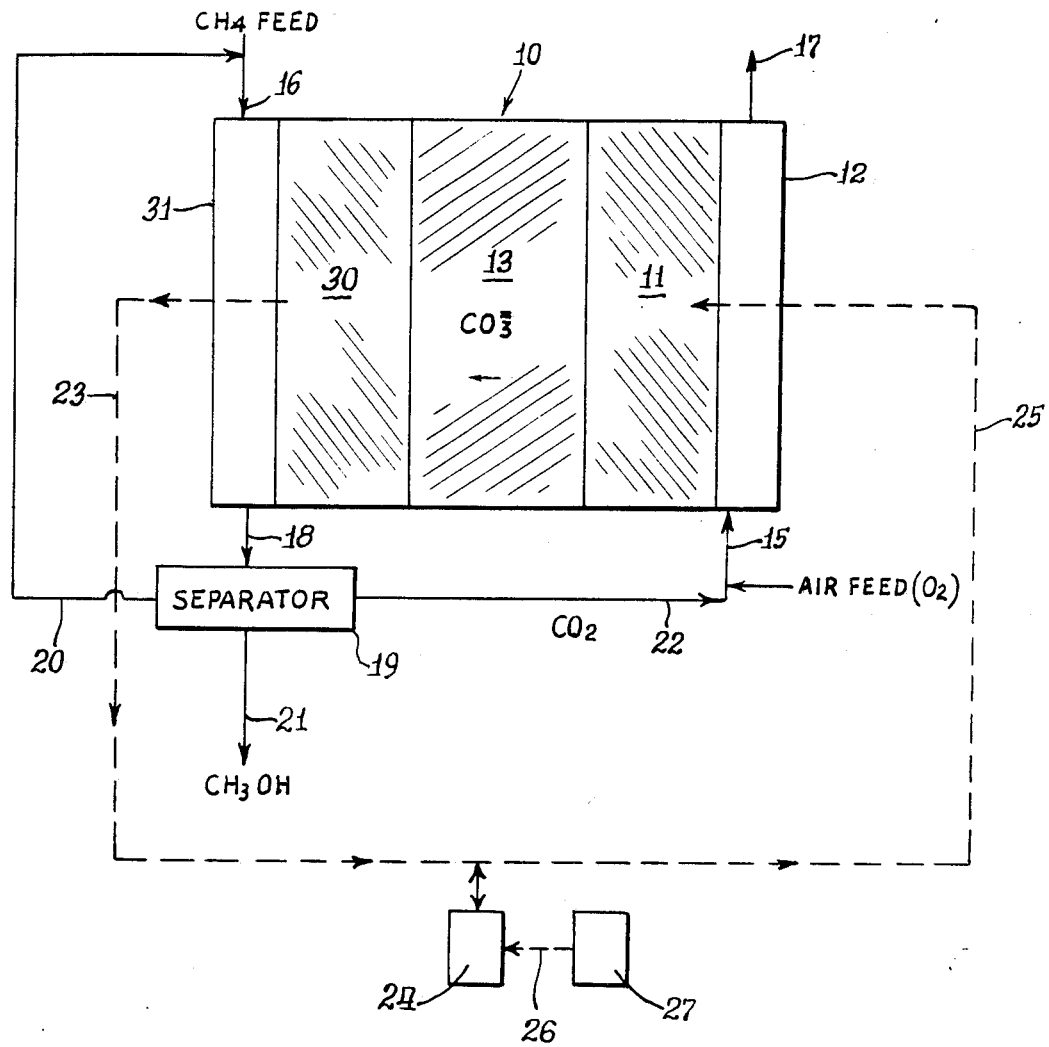

ELECTROCHEMICAL PRODUCTION OF PARTIALLY OXIDIZED ORGANIC COMPOUNDS

BACKGROUND OF THE INVENTION

1. Field of the Invention

This invention relates to an electrochemical method for the selective production of partially oxidized organic compounds such as alcohols, aldehydes, acids, and the like, at the catalytic anode of a fuel cell. Oxide anions are formed at the fuel cell cathode by ionization of oxygen-containing gas, and transported through electrolyte to the fuel cell anode where selective partial oxidation of organic compounds is facilitated by the fuel cell anode which comprises, at least in part, a catalyst selected from elements of the Periodic Table appearing in a group selected from the group consisting of Groups IB, IIB, IIIA, VB, VIB, VIIB and VIII. One important application of this invention relates to the production of methanol by partial oxidation of hydrocarbon gases, particularly natural gas, at the catalytic anode of a fuel cell.

2. Description of the Prior Art

Substantially all the methanol synthesized currently is produced by the catalytic hydrogenation of carbon monoxide. Carbon monoxide is supplied as synthesis gas comprising carbon monoxide and molecular hydrogen which is generally obtained by steam reforming of a hydrocarbon such as methane. Thus, two separate chemical reactions, requiring different reaction conditions, separated reaction zones or vessels, transport of product and reactants are performed in the conventional methanol synthesis processes, which operate at temperatures of about 250° to about 350° C. and at pressures of about 700 to 1500 psi. Because sufficiently active catalysts are not available to conduct the methanol forming reaction at preferred lower temperatures and pressures, higher than ideal temperatures and pressures are required to enhance the thermodynamically limited yield of methanol. The development of more active catalysts has lowered the temperature and pressure requirements during the formation of methanol from synthesis gas, but costs associated with reactor temperature control, compression and recirculation remain high.

Alternative methanol synthesis processes have focused on direct catalytic partial oxidation of methane, but direct partial oxidation processes have not been generally successful because suitable catalysts and reactors for controlling the oxidation have not been developed. Operating conditions of temperature and pressure, the condition of the reactor vessel surface and the catalyst "state" influence reaction kinetics, product yield and product composition. Methane synthesis by direct partial oxidation must be very closely controlled to maximize specificity and to minimize the formation of higher oxidation products.

A fuel cell system (hydrogen/chlorine) having a hydrogen diffusion anode, a halogen diffusion cathode, and utilizing molten halide or hydrogen ion containing electrolyte is taught in U.S. Pat. No. 3,669,750. One modification of this system is adapted for in situ reforming of fuels in molten alkali carbonate cells, and partial oxidation of the hydrocarbon fuels to alcohols, aldehydes, and is combined with direct reforming of these products. Hydrogen used as fuel, or produced during the reforming reaction, is the electrochemically active fuel. Water must be present, in the form of steam, to conduct reforming with a nickel catalyst to carbon dioxide and hydrogen. Any partial oxidation of hydrocarbons to alcohols, aldehydes, and the like, which occurs in this fuel cell is only incidental to the direct reforming reaction.

A fuel cell system in which internal reforming of the hydrocarbon content of fuel cell supply gas is achieved is described in U.S. Pat. No. 4,365,007. The hydrocarbon content of fuel supply gas, including methane, is reformed to produce hydrogen and carbon monoxide in molten carbonate and phosphoric acid fuel cells to provide electrochemically active components which can participate in the fuel cell reaction, and to offset heat generated in the cell during operation. Another method of reforming fuel to hydrogen in situ in electrochemical cells, is taught by U.S. Pat. No. 3,407,094. Partial oxidation is again mentioned as an incidental electrochemical reaction, but the principal and desired reaction is the reforming of fuel to hydrogen in a hydrogen anode system. U.S. Pat. No. 3,585,077 discloses an apparatus for controlling the fuel feed to a fuel cell system in which a reformer is separate from the fuel cell itself. Preparation of polyamides by electrolytic polymerization of lactams is taught by U.S. Pat. No. 3,419,482. A pressurized, high temperature fuel cell power plant is described in U.S. Pat. No. 4,041,210.

Oxidation of ethylene to ethylene oxide in the presence of a silver or silver alloy catalyst on a support such as alumina, in a plurality of electrolytic cells having solid electrolyte capable of transporting oxygen ions, is taught by U.S. Pat. No. 4,329,208. Trace amounts of chlorinated hydrocarbons may be added to the gas phase to increase the selectivity of the reaction to ethylene oxide upon application of voltage between two catalysts through a solid electrolyte.

Oxidation of ammonia to nitric oxide using porous platinum films deposited on an yttria-stabilized zirconia solid electrolyte fuel cell is described in "Cogeneration of Electric Power and Nitric Oxide in a Solid-Electrolyte Fuel Cell", M. R. S. Manton et al, 11th Energy Technology Conference, 1984.

SUMMARY OF THE INVENTION

Electrochemical methanol synthesis by direct partial oxidation of hydrocarbon gases, particularly methane, represents a potentially attractive and economical method for methanol synthesis. Traditional fuel cell design, however, provides anodes which either readily reform hydrocarbon compounds, or which promote complete oxidation of hydrocarbon compounds. If only partial oxidation is desired, as is the case in electrochemical methanol formation from the partial oxidation of hydrocarbon compounds, modification of anode catalysts, or anode composition, would be required. In addition, the elevated temperatures required during fuel cell operation may require the fuel cell to be operated at elevated pressures to suppress methanol decomposition.

Electrochemical partial oxidation of hydrocarbon gases may occur at the anode of a fuel cell in which negatively charged oxygenated species are formed at the cathode, and transported through electrolyte to the anode for reaction with hydrocarbon gases to form partially oxidized organic carbonaceous products. Selective formation of partially oxidized organic compounds is facilitated according to the process and apparatus of this invention, by a catalytic fuel cell anode which comprises, at least in part, a catalyst selected from elements of the Periodic Table appearing in a group selected from the group consisting of Groups IB, IIB, IIIA, VB, VIB, VIIB and VIII. Suitable form for the catalyst include metal, oxide, or cermet form. Preferred catalysts are selected from the group consisting of zinc, silver, nickel, aluminum, iron, copper, chromium, and mixtures thereof. A particularly preferred catalyst is copper oxide. The anode used in the process of this invention serves a dual function of electrode and catalyst in the cogeneration of electricity and production of partially oxidized organic compounds. Alternatively, when increased production of partially oxidized organic compounds is desired, the cell may be driven by supplying it with additional electric power.

It is an object of the present invention to electrochemically provide selective direct partial oxidation of hydrocarbon gases to organic compounds.

It is another object of the present invention to facilitate the production of partially oxidized organic compounds in a fuel cell system by utilizing a catalytic fuel cell anode at least partially comprising a metal, oxide, or cermet capable of catalyzing selective partial oxidation.

It is another object of this invention to provide electrochemical partial oxidation of organic compounds utilizing dry gases as fuel gases to the anode, excluding steam from the anode environment, and thereby inhibiting reforming reactions.

It is yet another object of the present invention to produce methyl alcohol by the selective partial oxidation of methane in an electrochemical reaction facilitated by a catalytic fuel cell anode.

It is yet another object of this invention to provide an energy efficient electrochemical method of methanol synthesis in which electrical energy may be cogenerated.

Projections indicate that the demand for methanol will increase significantly in the future, due to new markets for methanol. Methanol is currently produced by natural gas reforming using synthesis gas, the cost of synthesis gas representing a substantial cost factor in the production of methanol. Synthesis of other oxidized organic compounds, such as alcohols, aldehydes, acids, and the like, is also relatively costly. The present invention provides an alternative, electrochemical method for the production of oxidized organic compounds such as alcohols, aldehydes, acids, and the like, by selective direct partial oxidation of hydrocarbon fuel at the catalytic anode of a fuel cell system. This electrochemical conversion is particularly applicable to the production of methanol by selective direct partial oxidation of methane at the catalytic anode of a fuel cell system. Electrochemical conversion of methane obtained from remote sources to liquid products facilitates transportability from such remote areas.

Chemical energy is converted directly to electrical energy in a fuel cell system, so that thermodynamic efficiencies can approach 80 percent. In contrast, thermodynamic inefficiencies inherent in conventional combustion processes result in maximum efficiencies of about 30–40 percent in typical fuel combustion power generation systems. Electrochemical conversion using fuel cell systems avoids the inherent thermodynamic inefficiencies (Carnot limitations) of conventional combustion systems and provides potential for significantly greater overall efficiency.

Fuel cell systems comprise a cathode and an anode separated by an electrolyte which is specific for transport of a particular ion or group of related ions, and produce electrical energy which flows through an external circuit. The electrolyte used to transport ionic species between the electrodes generally categorizes the type of fuel cell and dictates the preferred operating conditions. Molten carbonate fuel cell systems, such as described in U.S. Pat. Nos. 4,009,321, 4,079,171 and 4,247,604, typically convert hydrogen or an active fuel electrochemically to produce carbon dioxide and steam. Electric power is the primary product desired.

The electrolyte utilized in the process of this invention must be capable of transporting oxygen containing anions from the cathode chamber to the anode chamber of the fuel cell. At least three types of molten electrolyte fuel cell systems may be used to provide partial oxidation of organic compounds under suitable operating conditions according to this invention. Due to process requirements, the environment in the fuel cell, and rapid decomposition of electrochemically formed methanol at high temperatures, the molten carbonate fuel cell appears to be the most suitable fuel cell system for production of partially oxidized organic compounds. In addition to the molten carbonate fuel cell system, at least two other oxygen containing anion salts, molten sulfates and nitrates, can be used as the electrolyte in the fuel cell systems of the present invention. The cathode and anode reactions with external electron transfer and passage of electrolyte ions through the molten electrolyte result in an overall reaction for these suitable fuel cells using methane as the organic compound as follows:

$$CH_4 + \tfrac{1}{2}O_2 \rightarrow CH_3OH$$

The anode and cathode reactions in each case are:

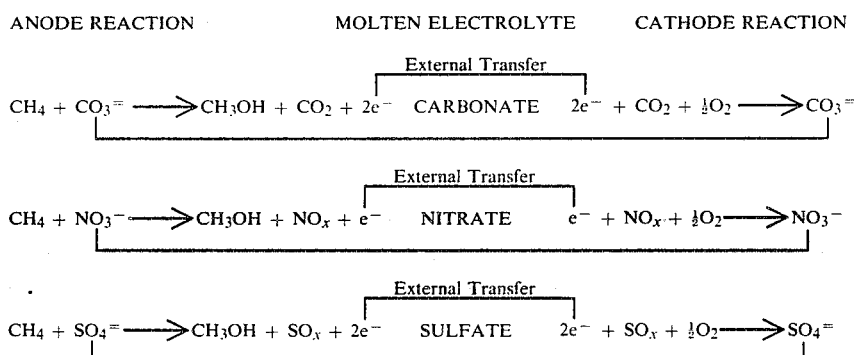

Transfer Through Electrolyte

Any oxygen containing anion conducting molten salt electrolyte, which operates within temperature ranges between about 300° and 750° C. is suitable for use with this invention.

Oxygen, or an oxygen containing gas, such as air, is supplied continuously to the cathode chamber during operation of the fuel cell. Oxide anions or oxygen containing anions are generated at the cathode and combine with electrolyte. The oxide anions are transported through the electrolyte to the anode chamber where the oxide ion is available for reaction with fuel comprising organic hydrocarbon gases supplied continuously to the anode. The catalytic anode selectively catalyzes direct partial oxidation of organic hydrocarbon compounds, to partially oxidized organic compounds. Organic gaseous compounds supplied to the anode are preferably "dry", that is, the feed stream does not comprise substantial amounts of moisture as steam reforming of organic hydrocarbon gases at the anode is not desired. It is suitable that the organic gaseous feed contain less than 10 mole percent and preferably less than 1 mole percent moisture.

Electrons released at the anode as a result of the electrochemical reaction according to this invention generate electric current which is generally relatively low, but a plurality of fuel cells may be coupled in series to increase the voltage and to provide useful quantities of electrical energy. Alternately, the system may be driven by providing additional electrical energy to increase production of partially oxidized organic compounds.

The fuel cell system used in this invention is physically similar to conventional fuel cells, using the electrolytes specified above, but the anode is modified to catalytically facilitate selective partial oxidation of dry organic gaseous compounds. The anodes used in the fuel cell according to this invention perform the usual electrical functions and additionally catalyze partial oxidation of organic hydrocarbons. Anodes suitable for use in the process of this invention comprise, at least in part, a catalyst selected from elements of the Periodic Table appearing in a group selected from the group consisting of Groups IB, IIB, IIIA, VB, VIB, VIIB and VIII. Suitable form for the catalyst include metal, oxide, or cermet form. Preferred catalysts are selected from the group consisting of zinc, silver, nickel, aluminum, iron, copper, chromium, and mixtures thereof. A particularly preferred catalyst is copper oxide. Catalyst material is thus provided at the anode, gas-electrolyte-electrode interface reaction site where gaseous organic hydrocarbon compounds are selectively converted to partially oxidized organic compounds. To reduce decomposition of the partially oxidized organic compounds being formed, it is desired that the gas residence time be about 0.1 second to about 10 seconds and preferably about 0.5 second to about 1 second. This method for partial oxidation of organic compounds does not require steam for reforming and in fact, any reforming reactions are desirably inhibited and occur only incidentally. In this way, desired partially oxidized organic compounds are formed directly and selectively from hydrocarbon fuels by electrochemical conversion in conjunction with electrical generation.

BRIEF DESCRIPTION OF THE DRAWING

The above and other objects and advantages of this invention will become apparent upon reading the description of preferred embodiments with reference to the drawing wherein:

The FIGURE shows schematically electrochemical partial oxidation of methane to methanol using a molten carbonate electrolyte fuel cell.

DESCRIPTION OF THE PREFERRED EMBODIMENTS

Organic hydrocarbonaceous fuels are electrochemically converted to partially oxidized organic compounds such as alcohols, aldehydes, acids and the like, in the fuel cell system according to this invention with the cogeneration of electricity. Alternatively, when increased production of partially oxidized organic compounds is desired, the cell may be driven by providing electrical energy to the fuel cell. A particularly useful application is the electrochemical conversion of methane to methanol in a molten carbonate fuel cell, as shown in the FIGURE. Fuel cell 10 comprises cathode 11 in cathode chamber 12 and anode 30 in anode chamber 31, the cathode and anode chambers being separated by electrolyte 13. Cathodes suitable for use in fuel cells according to this invention are the same as or similar to conventional cathodes used in molten carbonate fuel cells and comprise materials such as nickel. Catalytic anode 30 is substituted for the nickel anodes generally utilized in fuel cells of this type. Catalytic anode 30 is porous and comprises a catalyst selected from elements of the Periodic Table appearing in a group selected from the group consisting of Groups IB, IIB, IIIA, VB, VIB, VIIB and VIII. Suitable form for the catalyst include metal, oxide, or cermet form. Preferred catalysts are selected from the group consisting of zinc, silver, nickel, aluminum, iron, copper, chromium, and mixtures thereof. A particularly preferred catalyst is copper oxide. Porous catalytic anodes suitable for use in this invention may be produced by conventional sintering techniques.

Electrolyte 13 comprises an oxygen anion conducting molten salt electrolyte, preferably comprising molten alkali carbonates as disclosed more fully in U.S. Pat. Nos. 4,079,171 and 4,009,321. Oxygen anion conducting molten salt electrolytes such as sulfates and nitrates, are also suitable for use with this invention. The electrolyte functions to separate oxygen from the other constituents of the oxidant gas stream, in effect, providing the function of the air separation plant at conventional methanol synthesis plants. Fuel cells utilizing this type of electrolyte generally operate at temperatures of about 300° to about 750° C. The temperature range maintained during fuel cell operation is selected to maintain ionic mobility at a sufficient velocity to provide desired rates of partially oxidized product generation. Because many partially oxidized organic compounds, particularly methanol, decompose at temperatures within this range, pressurized conditions may be provided to inhibit the decomposition of partially oxidized organic compound product. Suitable operating conditions for the fuel cell system of this invention provide temperatures between about 300° and about 750° C., preferably about 400° to about 500° C., and pressures between about 1 atmosphere and about 100 atmospheres, preferably about 1 to about 10 atmospheres. To reduce the decomposition of formed partially oxidized organic products, suitable gas residence times in the anode compartment are about 0.1 second to about 10 seconds, preferably about 0.5 second to about 1.0 second.

Gas containing substantial amounts of oxygen is supplied to cathode chamber 12 through cathode gas supply conduit 15. The oxygen containing gas supplied to the cathode is reduced to form carbonate anions which combine with the molten carbonate electrolyte. Similar reactions occur to sulfates and nitrates, as more fully described above, when other molten electrolytes are utilized. The electrolyte thus separates the desired oxygen from the other constituents of the gas supplied to the cathode chamber. Gases not consumed in reduction at the cathode chamber are withdrawn through exhaust gas conduit 17.

Oxygen containing anions formed in the cathode chamber combine with electrolyte and are transported through the electrolyte to anode chamber 31 housing catalytic anode 30, where oxygen containing anions are decomposed to liberate the oxide ion. Fuel gas is supplied to anode chamber 31 through anode fuel gas supply conduit 16. The fuel gas comprises dry hydrocarbonaceous gases which are desired to be partially oxidized to organic compounds such as alcohols, aldehydes, acids, and the like. Suitable dry hydrocarbonaceous gases include methane, ethane, butane, and other alkanes and alkenes which are gaseous under the fuel cell operating conditions. In the fuel cell shown in the FIGURE, for methanol synthesis, fuel gas supplied to the anode preferably comprises synthesis gas having substantial quantities of methane.

Oxide ions liberated in the anode chamber combine with hydrocarbons to produce partially oxidized organic compounds such as alcohols, aldehydes, acids and the like. Selective partial oxidation of hydrocarbon gases is facilitated by catalytic anode 30 which catalyzes the electrochemical selective partial oxidation reaction. Partially oxidized product gases are withdrawn through product withdrawal conduit 18 and conveyed to separator 19, wherein the product gas is separated into its various constituents. Separated carbon dioxide may be recycled through conduit 22 to supply carbon dioxide for feed gas supplied to cathode chamber 12. Similarly, methane or other unoxidized feed gas may be separated and recycled through conduit 20 to supply fuel gas to anode chamber 31. The desired partially oxidized organic compound product, such as methanol, is withdrawn through partially oxidized product withdrawal conduit 21.

Electrons released during the electrochemical formation of partially oxidized organic compounds provide current flow through external conductor 23 from the anode, which is connected to external circuit 24 for electrical power production, and the circuit is completed by the flow of electrons through external conductor 25 to cathode 11. Although fuel cells of this type which are designed to provide electrochemical conversion of hydrocarbon gases to partially oxidized organic compounds do not generate great amounts of electricity, these fuel cells may be connected in series to provide useful amounts of electrical energy.

When increased production of partially oxidized organic compounds is desired, additional electrical energy may be supplied to the fuel cell system. In one embodiment, electrical power source 27 provides electrical energy through conductor 26 to external circuit 24 and additional electrical energy is distributed to the fuel cell system.

The following examples are set forth in considerable detail for the purpose of specifically illustrating the process of this invention and should not be considered to limit the invention in any manner.

EXAMPLES I–IV

A fuel cell system as generally shown in the FIGURE was assembled to produce methanol from methane electrochemically. The assembled fuel cell was about 4 inches by 4 inches, providing approximately 94 $cm^2$ cell area. Molten carbonates electrolyte was utilized having the following composition: 40 weight percent $LiAlO_2$ and 60 weight percent carbonate which was 62 mole percent $Li_2CO_3$ and 38 mole percent $K_2CO_3$. The cathode utilized was a conventional nickel oxide cathode, and the anode was a catalytic anode of copper oxide. Commercial cylinders of methane and oxidant gas (25 vol. percent $CO_2$ and 75 vol. percent air) were used. The cell was operated at 1 to 6 inches water pressure above atmospheric at a temperature of 650° C. for 18 hours under the methane feed and current conditions indicated. The results of four cell operations were as follows:

TABLE 1

| Example | $CH_4$ feed cc/min. | Gas Residence sec. | Current Amps/$ft^2$ | Total current Amps. | Potential mV | Condensate Collected cc | Oxidized Organics in Condensate wt % |
|---|---|---|---|---|---|---|---|
| I | 150 | 4.13 | 160 | 16 | −300* | 5 | .22 |
| II | 1200 | .52 | 40 | 4 | 44 | 7 | .53 |
| III | 1200 | .52 | 40 | 4 | 200 | 11 | .53 |
| IV | 1200 | .52 | 60 | 6 | 127 | 13.5 | — |

*negative sign shows the cell is being driven.

EXAMPLES V–VIII

The same fuel cell, electrolyte, electrodes and operating conditions as set forth in Examples I–IV were used except that commercial ethane was used as the gaseous hydrocarbon feed and the cell was operated at 550° C. to result in the partially oxidized organic products as follows:

TABLE 2

| Example | $C_2H_6$ Feed cc/min | Residence Time sec. | Total Current Amps. | Oxidized Organics in Condensate Wt % |
|---|---|---|---|---|
| V | 300 | 2.07 | 2 | 0.8 |
| VI | 300 | 2.07 | 16 | .18 |
| VII | 600 | 1.03 | 10 | .10 |
| VIII | 1200 | .52 | 16 | .41 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. Process for direct electrochemical partial oxidation of gaseous organic hydrocarbons in a molten salt, oxygen containing, anion conducting electrolyte fuel cell having an anode catalytic to said partial oxidation in an anode compartment and a cathode in a cathode compartment, said catalytic anode and said cathode separated by a molten salt oxygen containing electrolyte and in external electrical communication, said process comprising:
   supplying oxygen containing gas to said cathode compartment and contacting said cathode with said molten salt oxygen containing electrolyte under oxidizing reaction conditions to produce oxygen containing anions;
   transporting said oxygen containing anions through said molten salt oxygen containing electrolyte to said catalytic anode;
   supplying gas consisting essentially of organic hydrocarbon to said anode compartment contacting said catalytic anode with said dry gaseous organic hydrocarbon and oxygen containing anions transported by said electrolyte from said cathode under reaction conditions to produce a partial oxidation product of said organic hydrocarbon, reduced oxygen containing material and electrons;
   passing said electrons from said anode to said cathode through an external electrical communication for charge balance; and
   removing said partial oxidation product from said anode compartment.

2. The process of claim 1 wherein said oxygen containing gas comprises air.

3. The process of claim 1 wherein said oxygen containing gas comprises $CO_2$ separated from product from said anode compartment.

4. The process of claim 1 wherein said electrolyte is selected from the group consisting of carbonate, sulfate and nitrate.

5. The process of claim 1 wherein said electrolyte is carbonate.

6. The process of claim 1 wherein said organic hydrocarbon is selected from the group consisting of alkanes and alkenes.

7. The process of claim 1 wherein said organic hydrocarbon is selected from the group consisting of methane, ethane, propane, butane, ethene, propene and butene.

8. The process of claim 1 wherein said organic hydrocarbon comprises less than 10 mole percent moisture.

9. The process of claim 1 wherein said organic hydrocarbon comprises less than 1 mole percent moisture.

10. The process of claim 1 wherein the gas residence time in said anode compartment is about 0.1 second to about 10 seconds.

11. The process of claim 1 wherein the gas residence time in said anode compartment is about 0.5 second to about 1 second.

12. The process of claim 1 wherein said catalytic anode comprises a catalyst selected from elements of the Periodic Table appearing in a group selected from the group consisting of Groups IB, IIB, IIIA, VB, VIB, VIIB and VIII.

13. The process of claim 1 wherein said catalytic anode comprises a catalyst selected from the group consisting of zinc, silver, nickel, aluminum, iron, copper, chromium, and mixtures thereof in metallic, oxide, or cermet form.

14. The process of claim 1 wherein said catalytic anode comprises a copper catalyst in the chemical form selected from the group consisting of metallic, oxide, cermet, and mixtures thereof.

15. The process of claim 1 wherein said fuel cell is operated at a temperature of about 300° to about 750° C.

16. The process of claim 1 wherein said fuel cell is operated at a temperature of about 400° to about 500° C.

17. The process of claim 1 wherein said fuel cell is operated at a pressure of about 1 to about 100 atmospheres.

18. The process of claim 1 wherein said fuel cell is operated at a pressure of about 1 to 10 atmospheres.

19. The process of claim 1 wherein additional electrons are supplied to said cathode from an external electrical energy source.

20. The process of claim 1 wherein said dry gaseous organic hydrocarbon comprises ethane and said partial oxidation product comprises ethanol.

21. The process of claim 1 wherein said organic hydrocarbon comprises methane and said partial oxidation product comprises methanol.

22. The process of claim 21 wherein said electrolyte is carbonate; said organic hydrocarbon supplied to said anode compartment is selected from the group consisting of methane and ethane; said organic hydrocarbon comprises less than 10 mole percent moisture; said catalytic anode comprises a catalyst selected from the group consisting of zinc, silver, nickel, aluminum, iron, copper, chromium, and mixtures thereof in metallic, oxide, or cermet form; said fuel cell is operated at a temperature of about 300° to about 750° C.; said gas residence time in said anode compartment is about 0.1 second to about 10 seconds; and said fuel cell is operated at a pressure of about 1 to about 100 atmospheres.

23. The process of claim 22 wherein said catalytic anode comprises copper oxide.

* * * * *